US012596003B2

(12) United States Patent
Wang et al.

(10) Patent No.: US 12,596,003 B2
(45) Date of Patent: Apr. 7, 2026

(54) CALCULATION METHOD FOR THICKNESS OF INNER OXIDE LAYER OF MARTENSITIC HEAT-RESISTANT STEEL IN STEAM ENVIRONMENT

(71) Applicant: Wuhan University, Wuhan (CN)

(72) Inventors: Xue Wang, Wuhan (CN); Conghao Du, Wuhan (CN)

( * ) Notice: Subject to any disclaimer, the term of this patent is extended or adjusted under 35 U.S.C. 154(b) by 406 days.

(21) Appl. No.: 18/335,170

(22) Filed: Jun. 15, 2023

(65) Prior Publication Data

US 2023/0341242 A1 Oct. 26, 2023

(30) Foreign Application Priority Data

Apr. 20, 2023 (CN) .......................... 202310439946.7

(51) Int. Cl.
*G01B 21/08* (2006.01)
*B01J 19/02* (2006.01)

(52) U.S. Cl.
CPC .............. *G01B 21/08* (2013.01); *B01J 19/02* (2013.01); *B01J 2219/024* (2013.01); *B01J 2219/0281* (2013.01); *B01J 2219/0286* (2013.01)

(58) Field of Classification Search
CPC ........ G01D 1/16; G01B 21/085; G01B 21/08; B01J 2219/024; B01J 2219/0281; B01J 2219/0286; B01J 19/02; C23C 8/18; C22C 38/18; Y04S 10/50; G16C 60/00; G16C 20/10; G16C 20/30; G06F 17/10
See application file for complete search history.

(56) References Cited

U.S. PATENT DOCUMENTS

| 2018/0120094 A1 | 5/2018 | Moshel | |
| 2020/0176228 A1 | 6/2020 | Oka | |
| 2021/0202050 A1* | 7/2021 | Zhang | .................. G01B 21/085 |
| 2021/0310802 A1 | 10/2021 | Pedersen et al. | |

FOREIGN PATENT DOCUMENTS

JP 2003090506 A * 3/2003

* cited by examiner

*Primary Examiner* — Judy Nguyen
*Assistant Examiner* — James Split

(57) ABSTRACT

The present application discloses a calculation method for thickness of inner oxide layer of a martensitic heat-resistant steel in steam environment. The calculation method takes into account the steam temperature, the steam pressure and the operation time, which are the three factors that have significant effects on the thickness of the oxide layer, and with the help of a metal oxidation kinetic model, the formula is mathematically modified by combining a large number of actual operation and laboratory simulation experimental data of the power plant. A calculation method for thickness of inner oxide layer of 9% Cr martensitic heat-resistant steel in steam environment is obtained by using linear fitting and curve fitting, etc.

8 Claims, 7 Drawing Sheets

T=550 ℃

T=575 ℃

T=550 °C

T=575 °C

T=600 °C

T=650 ℃

CALCULATION METHOD FOR THICKNESS OF INNER OXIDE LAYER OF MARTENSITIC HEAT-RESISTANT STEEL IN STEAM ENVIRONMENT

CROSS-REFERENCE TO RELATED APPLICATIONS

This application claims priority to Chinese Patent Application No. 202310439946.7, filed on Apr. 20, 2023. The disclosures of the above-mentioned applications are incorporated herein by reference in their entireties.

TECHNICAL FIELD

The present application belongs to the technical field of martensitic heat-resistant steels, and particular to a calculation method for a thickness of an inner oxide layer of a martensitic heat-resistant steel in steam environment.

BACKGROUND

Martensitic heat-resistant steels include T/P91, T/P92, E911, T/P93 (9Cr-3W-3Co), T/P122 and other 9-12% Cr heat-resistant steels. Martensitic heat-resistant steel has excellent high-temperature creep strength, good thermal conductivity and low coefficient of linear expansion, and is widely used in the manufacture of super critical units of the main steam pipe, a collector box, a superheater, a reheater and other important high-temperature components. As the working steam pressure of the unit increases, the steam oxidation resistance of the martensitic heat-resistant steel becomes one of the key factors affecting the life of high-temperature components. In the long-term operation of high-temperature components, because the growth of the thickness of the oxide layer will lead to a reduction in the effective wall thickness of the pipe wall, the stress on the pipe wall also is increased accordingly; at the same time, the oxidation layer causes the thermal conductivity of the pipe wall to deteriorate, so that the average operation temperature of the pipe wall is increased, if it is in over-temperature service state for long time, when the development to a certain extent, eventually the pipe will burst. Therefore, to assess the service life of the components can achieve early warning to reduce accidents, it is necessary to predict the thickness of the oxide layer of the superheater, reheater and other components in service in steam environment.

To calculate the thickness of the inner layer of the oxide film, it is necessary to use the oxidation kinetic model of heat-resistant steel in the steam environment. The current domestic and foreign steam oxidation kinetic model of the martensitic heat-resistant steel generally only considers the effect of steam temperature, rarely consider the effect of the changes in steam pressure, especially doesn't consider the coupling effect of the two. In fact, the steam temperature and the steam pressure in different components of the unit vary greatly, for example, the steam temperature of the high temperature reheater is higher than that of the superheater, but the steam pressure is significantly lower than that of the superheater. Therefore, only by considering the comprehensive effects of the steam temperature and the steam pressure can we accurately predict the thickness of the oxide layer of different components and thus their remaining life. In addition, most of the current steam oxidation kinetic models for martensitic heat-resistant steels are based on the experimental results of the oxidation weight gain method, which cannot directly calculate the thickness of the oxide layer.

Although a few papers have reported high-temperature steam oxidation kinetic models for martensitic heat-resistant steels based on the growth of the thickness of the oxide layer, the oxide layer includes both the inner layer and the outer layer, and these papers do not distinguish between the thickness of the outer layer and the thickness of the inner layer. The Applicant's study shows that only the growth of the thickness of the inner layer leads to a thinning of the thickness of the pipe wall, which affects the pipe's life, so that predicting the thickness of the inner layer is more of practical importance.

SUMMARY

In order to solve the problems in the related art, the present application provides a calculation method for thickness of inner oxide layer of a martensitic heat-resistant steel in steam environment, which can easily and quickly calculate the thickness of the inner oxide layer of 9% Cr martensitic heat-resistant steel in steam environment based on the steam temperature, the steam pressure and the operation time, thus the calculation accuracy is significantly improved, and the remaining life of the high-temperature components can be assessed in the actual operation of the power plant without cutting the pipe, the safe operation of the unit is ensured and the cost is reduced, and it has important industrial application value.

In order to achieve the above purpose, the present application adopts the following technical solutions.

The present application provides a calculation method for a thickness of an inner oxide layer of a martensitic heat-resistant steel in steam environment, the martensitic heat-resistant steel is 9% Cr heat-resistant steel, and the thickness of inner oxide layer in steam environment is calculated by a formula:

$$Y = \omega * Y_T + (1 - \omega) * Y_p \tag{1}$$

where $$Y_T = k\exp\left(\frac{-Q}{RT}\right)t^n \tag{2}$$

$$Y_p = a + bt + cp + dt^2 + hpt + ip^2 \tag{3}$$

where Y is the thickness of the inner oxide layer in steam environment (μm), YT is the relationship between a steam temperature and the thickness of the inner oxide layer in steam environment (μm), Yp is a relationship between a steam pressure and the thickness of the inner oxide layer in steam environment (μm), ω is a weight coefficient, k, a, b, c, d, h, i are fitting coefficients, Q is an activation energy (J·mol-1), R is a gas constant, T is the steam temperature (K), p is the steam pressure (MPa), t is time (h).

In an embodiment, the steam temperature is from 550 to 650° C. and the steam pressure is from 5.0 to 25.0 MPa.

In an embodiment, the operation time t is from 1,000 to 150,000 h.

In an embodiment, in the formula for calculating Y, in response to that the steam temperature T is less than 600° C., ω is 0.1682±0.1136; in response to that the steam temperature T is not less than 600° C., ω is 0.6891±0.2269.

In an embodiment, in the formula for calculating YT, n is equal to 0.25.

In an embodiment, in the formula for calculating YT, the mathematical relationship between the fitting coefficient k and the steam temperature T is $$k = 1.01 \times 10^{-42} T^{14.68}.$$

In an embodiment, in the formula for calculating YT, the mathematical relationship between the activation energy Q and the time t is $$Q = 106661.33557 - 0.36498t + 3.07915 \times 10^{-6} t^2.$$

In an embodiment, in the formula for calculating Yp, the fitting coefficient a is 22.21, the fitting coefficient b is 0.0009334, the fitting coefficient c is −0.8198, the fitting coefficient d is −7.655×10-10, the fitting coefficient h is 1.79×10-5, and the fitting coefficient i is 0.1152.

The present application provides an application of the calculation method as mentioned above on assessing a life of a martensitic heat-resistant steel component operating in steam environment in power plant.

According to the above-mentioned scheme, the steam temperature is from 550 to 650° C. and the steam pressure is from 5.0 to 25.0 MPa.

In the present application, the relationship between inner oxide thickness Y and steam temperature T or steam pressure p is studied separately, and then a weighting analysis of the degree of temperature and pressure affecting the thickness of the inner oxide layer is performed. It is found that the weight of temperature on the thickness of the inner oxide layer varies in different temperature ranges under the coupling effect of steam temperature and steam pressure. Finally, the formula is mathematically modified based on the traditional exponential function model by combining the actual data, and a formula for calculating the thickness of the inner oxide layer of 9% Cr martensitic heat-resistant steel is proposed that integrates the three factors: steam temperature, steam pressure and operation time. It is not necessary to cut the pipe for measurement, achieving cost savings and estimation of the thickness of the inner oxide layer of the pipe without affecting operation. In addition, by calculating the thickness of the inner oxide layer of 9% Cr martensitic heat-resistant steel by this formula, it can accurately reflect the degree of oxidation and corrosion of the inner wall of the pipe, and provide basic data for calculating the remaining life of the component.

The present application has the beneficial effects of:

1. The present application is first to study the thickness of the inner oxide layer of martensitic heat-resistant steel in supercritical steam environment, steam temperature, steam pressure and operation time are integrated to easily and quickly calculate the thickness of the inner oxide layer of 9% Cr martensitic heat-resistant steel in steam environment, and the accuracy of the prediction is greatly improved, the error can be controlled within 6%. The thickness of the inner oxide layer can be measured without cutting the pipe in actual power plant, which reduces the cost, improves work efficiency, and has more practical value.

2. Since the present application calculates the thickness of the inner oxide layer of martensitic heat-resistant steel in supercritical steam environment with high accuracy, such that it can fully reflect the thinning degree of oxidation and corrosion of the inner wall of martensitic heat-resistant steel pipe, assess the remaining life of the components, and ensure the safe operation of the unit, which has important industrial application value.

3. The present application determines the different weights of the effect of temperature on the thickness of the inner oxide layer in different temperature ranges, further improving the accuracy of the calculation.

DETAILED DESCRIPTION OF THE EMBODIMENTS

Figure 1A:
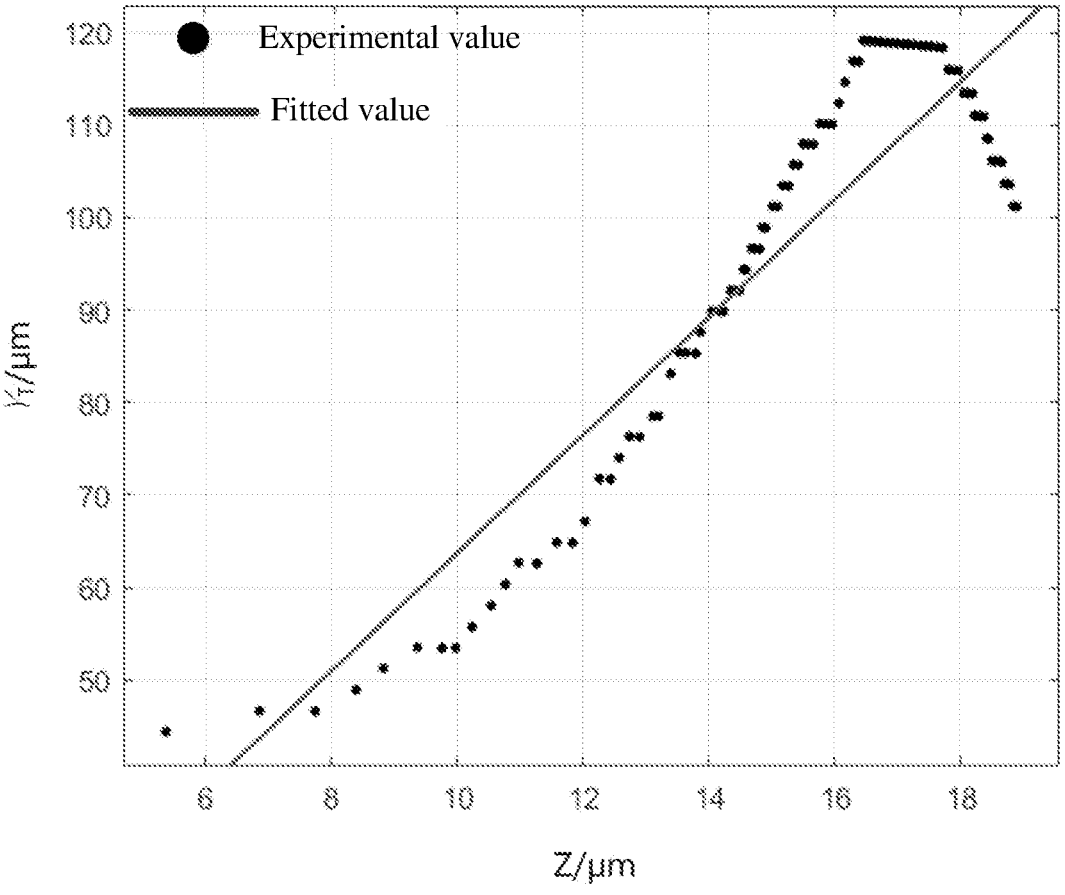
FIG. 1a-e is a fitted curve diagram of the thickness of the inner oxide layer YT and Z according to an embodiment of the present application.
Figure 1B:
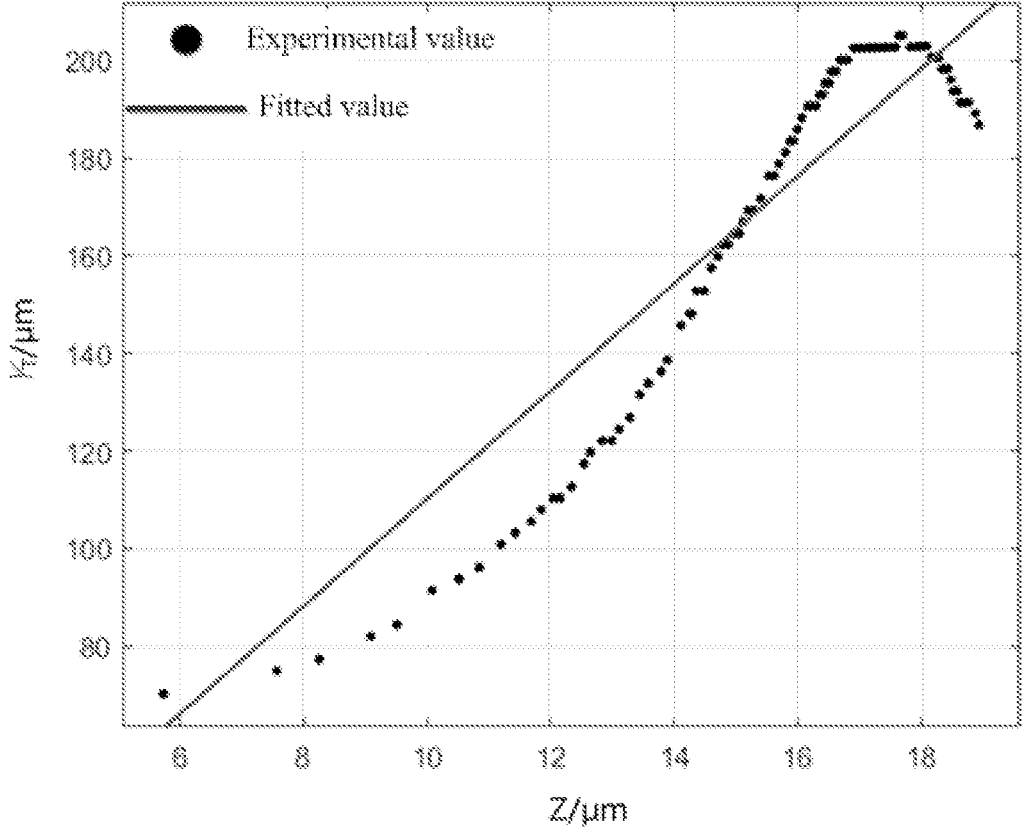
Figure 1C:
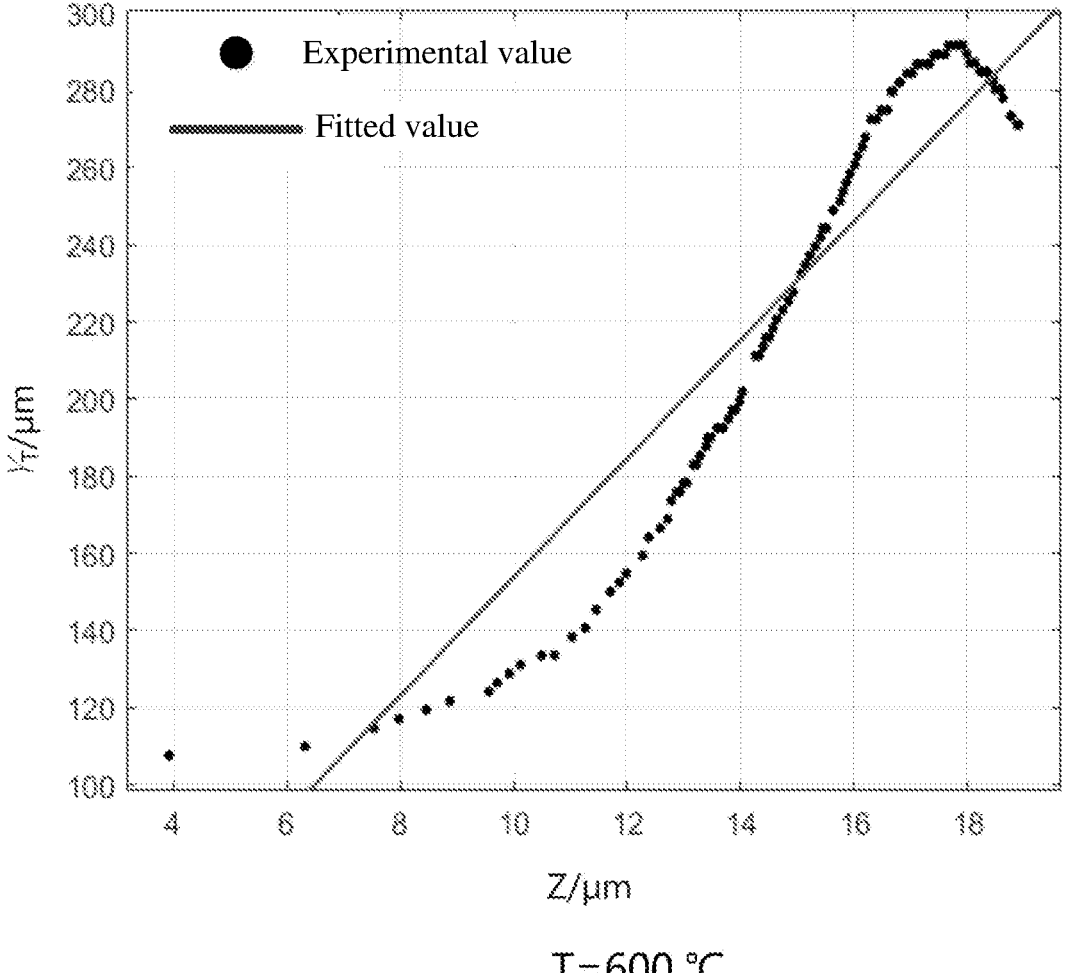
Figure 1D:
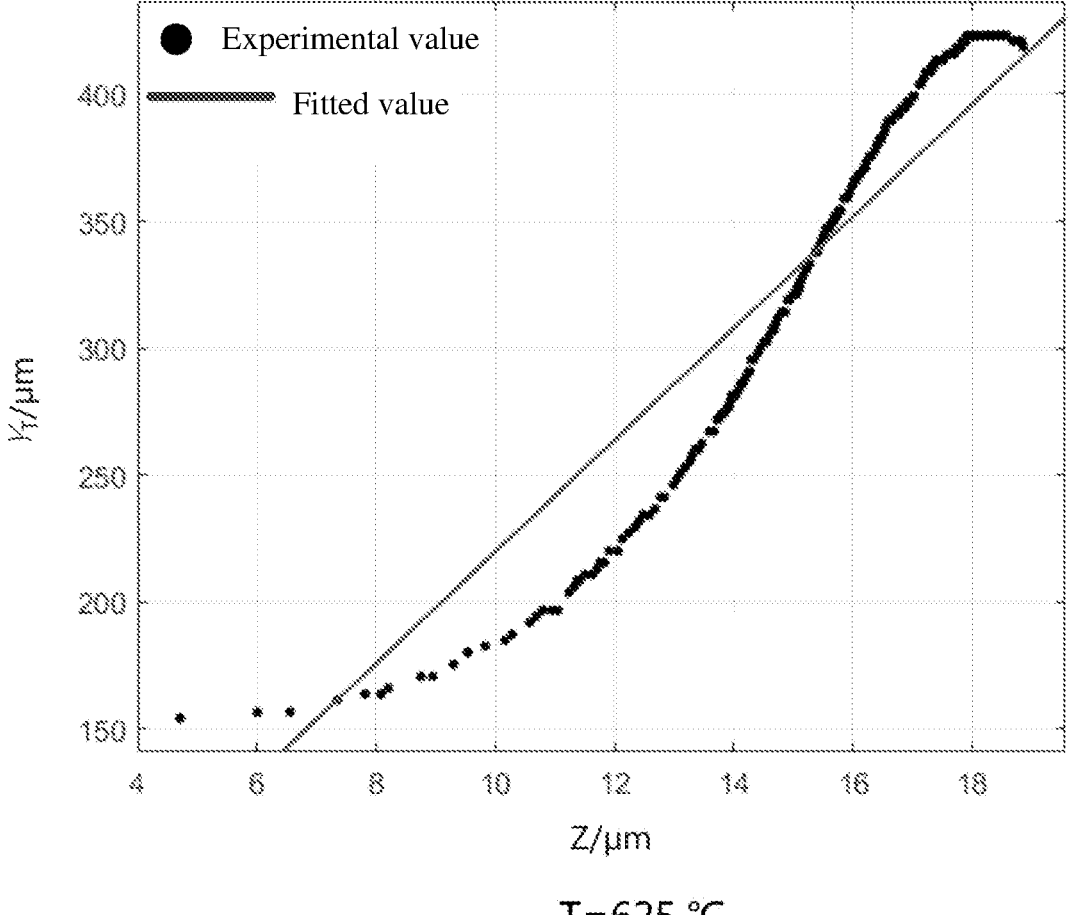
Figure 1E:
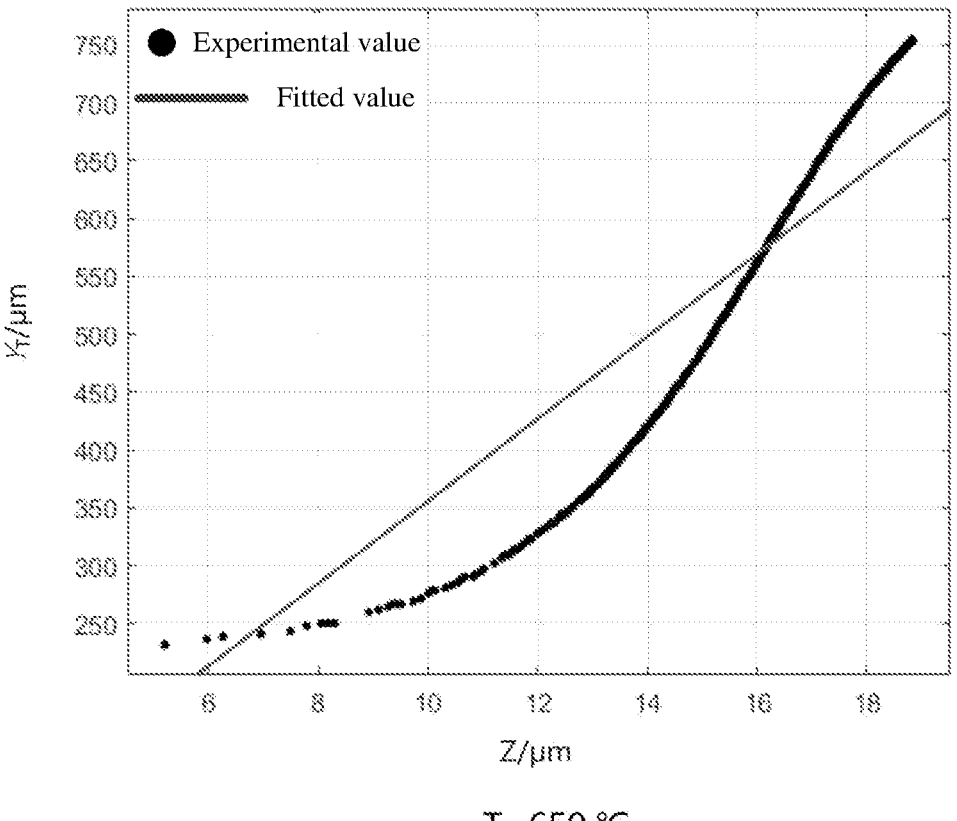

The technical solutions of the present application are further explained and illustrated by specific embodiments below.

(1) The Relationship Between the Thickness of the Inner Oxide Layer YT and the Temperature T.

To explore the effect of temperature T and time t on the oxide layer of high temperature heating surface of the power plant boiler, the thickness of the inner oxide layer YT and temperature T in high temperature conditions conforms to the following exponential function law:

$$Y_T = k \exp\left(\frac{-Q}{RT}\right) t^n \tag{1}$$

where k is the coefficient, Q is the activation energy (J·mol-1), R is a gas constant, T is the temperature (K), and t is the time (h).

A large amount of data from the actual power plant and the simulation experiments in the laboratory is collected in the embodiment of the present application, including the thickness of the inner oxide layer of 9% Cr heat-resistant steel such as T/P91 and T/P92 at the temperature from 550° C. to 650° C. and at the steam pressure from 5.0 to 25.0 MPa for the oxidation time from 1,000 to 150,000 h; the parameters n, Q, and k in the formula (1) are calculated by using the above data. The calculation method is shown below:

Step 1: calculating n.

When a specific temperature T is taken, kexp $$\frac{-Q}{(RT)}$$

is a constant. When the pressure is certain, the experimental data at each temperature is substituted into the formula for fitting, and the fitting results of two different sets of data as follows.

The first set:

When T=550° C., then YT=5.3307±0.36426t0.25745±0.00604.

When T=575° C., then YT=3.8695±0.25881t0.32759±0.00588.

When T=600° C., then YT=7.4295±0.57287t0.29728±0.00675.

When T=625° C., then YT=16.0928±1.29516t0.24991±0.0071.

When T=650° C., then YT=31.4784±1.91864t0.21077±0.0054.

The second set:

When T=550° C., then YT=5.1523±0.76277t0.26299±0.01301.

When T=575° C., then YT=3.9382±0.52155t0.33434±0.01156.

When T=600° C., then YT=5.66428±0.63578t0.33218±0.00987.

When T=625° C., then YT=5.52665±0.39467t0.36569±0.00628.

When T=650° C., then YT=2.47527±0.14564t0.37688±0.00511.

It can be found that n is from about 0.21 to 0.35 and fluctuates around 0.25, indicating that the oxidation kinetics of 9% Cr heat-resistant steel basically obey the cubic law, so n is taken as 0.25, and then the formula (1) is modified as follows $$Y_T = k \exp\left(\frac{-Q}{RT}\right) t^{0.25} \tag{2}$$

Step 2: calculating the activation energy Q.

Making logarithmic transformation on both sides of formula (2) to obtain $$\ln Y_T = \ln\left(k t^{0.25}\right) - \frac{Q}{RT}.$$

When a specific time t is taken, then $\ln(k t^{0.25})$ is a constant and is noted as G. The above formula is simplified to $$\ln Y_T = G - \frac{Q}{RT}. \tag{3}$$

When t is equal to 1,000 h, 10,000 h, 50,000 h, 100,000 h, 150,000 h, the experimental data are substituted into the fitting formula obtained in step 1, and the values lnY are calculated for T equal to 550° C., 575° C., 600° C., 625° C., 650° C., respectively, and then substituted back to the formula (3) to calculate the activation energy Q for different times t as shown in Table 1.

TABLE 1

| Activation energy at different times | |
|---|---|
| t/h | Q/J · mol⁻¹ |
| 1000 | 106391.7023 |
| 10000 | 103465.6272 |
| 50000 | 95473.5117 |
| 100000 | 101548.8781 |
| 150000 | 121001.0501 |

From Table 1, it can be seen that the Q differs at different times, indicating that the activation energy of the oxidation reaction varies at different times. It is found that the oxidation reaction of 9% Cr heat-resistant steel is a complex and dynamic process. The composition and structure of the oxidation products and oxidation mechanism vary at different stages of the reaction. Therefore, the present application uses a mathematical model to fit the variation of the activation energy with time and obtains that the activation energy Q with time t is highly consistent with the following mathematical model, the formula is:

$$Q = 106661.33557 - 0.36498t + 3.07915 \times 10^{-6} t^2 \tag{4}$$

Substituting the formula (4) back into the formula (2), the corrected thickness formula is:

$$Y_T = k \exp\left(\frac{-\left(106661.33557 - 0.36498t + 3.07915 \times 10^{-6} t^2\right)}{RT}\right) t^{0.25}. \tag{5}$$

Step 3, calculating the coefficient k.

A specific temperature T and the operation time t are selected, then $$k \exp\left(\frac{-\left(106661.33557 - 0.36498t + 3.07915 \times 10^{-6} t^2\right)}{RT}\right) t^{0.25}$$

is a constant value and is recorded as Z, then the above formula is changed to YT=k*Z. The experimental data at each temperature is substituted into the formula (5) in turn and fitted to obtain the coefficient k. It is found that the k varies at different temperatures, the fitted curve is shown in the FIG. 1a-e, and the results are:

When T=550° C.; then YT=(6.37±0.109)*Z.

When T=575° C.; then YT=(11.02±0.17)*Z.

When T=600° C., then YT=(15.39±0.23)*Z.

When T=625° C., then YT=(21.98±0.25)*Z.

When T=650° C., then YT=(35.58±0.42)*Z.

The relationship between the k and temperature T is obtained as:

$$k = 1.01 \times 10 - 42T14.68 \tag{6}$$

It can be seen that as the temperature increases, the k becomes larger. This indicates that the higher the temperature, the greater the influence of temperature on the thickness of the inner oxide layer. Therefore, finally, the fitting formula for the thickness of the inner oxide layer YT and the temperature T is $$Y_T = 1.01 \times 10_{-42} T^{14.68} \exp\left(\frac{-\left(106661.33557 - 0.36498t + 3.07915 \times 10^{-6} t^2\right)}{RT}\right) t^{0.25} \tag{7}$$

In the above formula, the unit of the temperature T is K, the unit of the time t is h, and the unit of the calculated thickness of the inner oxide layer YT is μm.

(2) The Relationship Between the Thickness of the Inner Oxide Layer Yp and the Steam Pressure p.

To investigate the influence of the pressure p and the time t on the formation of the oxide layer on the high temperature heating surface of the power plant boiler, the experimental data about the thickness of the inner oxide layer of 9% Cr martensitic heat-resistant steel at different time t and different pressure p is filtrated and processed, the results are shown in Table 2:

TABLE 2

The thickness of the inner oxide layer of 9%Cr martensitic heat-
resistant steel at different times and different steam pressures:

| Time t/h | Steam pressure p/Mpa | thickness of the inner oxide layer $Y_p$/μm |
|---|---|---|
| 1169.916 | 5.0 | 35.422 |
| 1466.175 | 15.0 | 48.916 |
| 1767.934 | 20.0 | 69.157 |
| 1228.343 | 25.0 | 107.108 |
| 10018.521 | 5.0 | 42.169 |
| 10031.581 | 15.0 | 58.193 |
| 10048.766 | 20.0 | 79.277 |
| 10084.509 | 25.0 | 123.133 |
| 50267.199 | 5.0 | 75.060 |
| 50004.621 | 15.0 | 102.892 |
| 50034.178 | 20.0 | 139.157 |
| 50081.607 | 25.0 | 197.349 |
| 100222.328 | 5.0 | 117.229 |
| 100264.946 | 15.0 | 169.518 |
| 100308.250 | 20.0 | 222.651 |
| 100064.232 | 25.0 | 273.253 |
| 150177.458 | 5.0 | 159.398 |
| 150242.071 | 15.0 | 238.675 |
| 150270.941 | 20.0 | 274.096 |
| 122611.575 | 25.0 | 287.590 |

Figure 2:
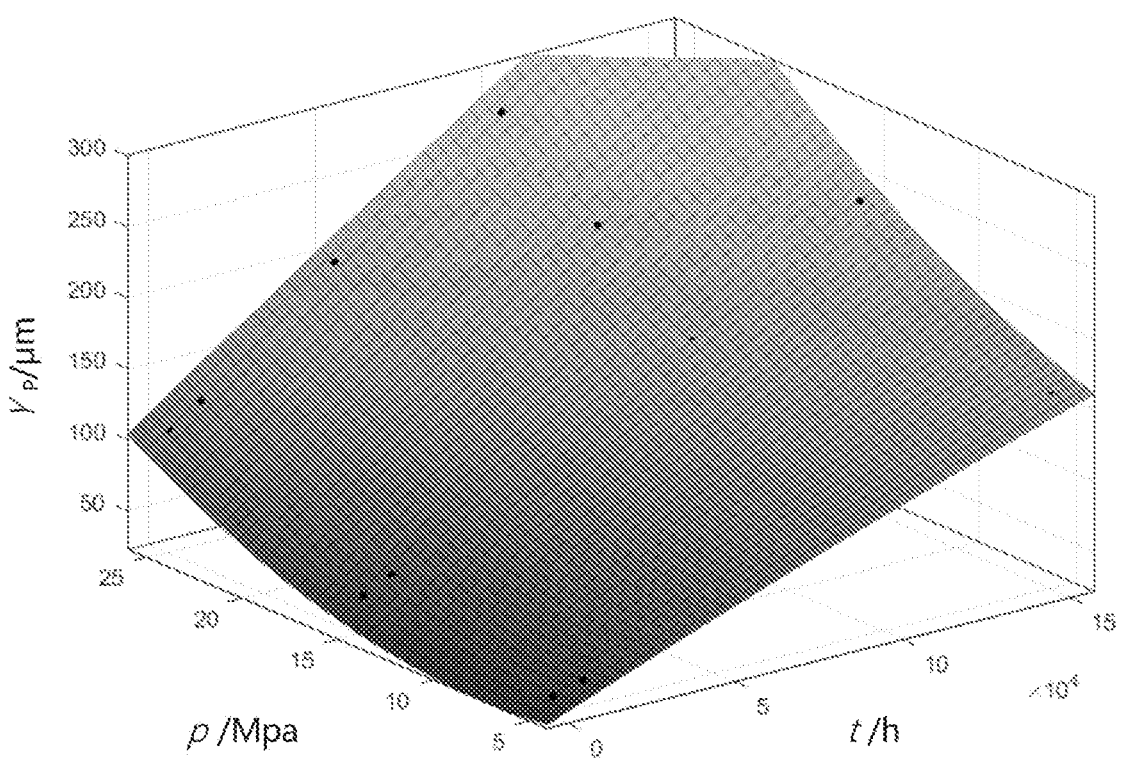
FIG. 2 is a relationship diagram of the thickness of the inner oxide layer Yp and the selected pressure p and time t according to an embodiment of the present application.

The above data is drawn to obtain a relationship diagram of the thickness of the inner oxide layer Yp and the selected pressure p and the time t shown in the FIG. 2.

It can be found that there is a binary quadratic relationship between the thickness of the inner oxide layer Yp and the pressure p and time t. The following formula is obtained by three-dimensional nonlinear surface fitting:

$$Yp=a+bt+cp+dt2+hpt+ip2 \qquad (8).$$

Step 1: Determining the coefficients i, h, c with the p term.

When a specific time t is selected, the term containing t is fixed and the formula (8) is transformed into a parabolic formula about p. The coefficients i, h, c with the p term can be obtained by fitting the data after substitution.

i=0.1152±0.03315 h=1.79×10−5±4.74×10−6 c=−0.8198±1.0842.

Step 2: Determining the coefficients d, b with the t term.

Similarly, when a specific pressure p is selected, the term containing p is fixed and formula (8) is transformed into a parabolic formula about t. The coefficient d, b with the t term can be obtained by fitting the data after substitution.

d=−7.655×10−10±7.7735×10−10 b=0.0009334±0.0001543.

Step 3: Determining the coefficient after the five coefficients are determined. The coefficients already obtained above are substituted into the formula (8), and then substituting all data for three-dimensional nonlinear surface fitting, to obtain the coefficient a=22.21±9.65, thus the formula (8) is changed to:

$$Yp=22.21+0.0009334t+(-0.8198p)+(-7.655\times \\ 10^{-10}t^2)+1.79\times10^{-5}tp+0.1152p^2 \qquad (9).$$

Figure 3:
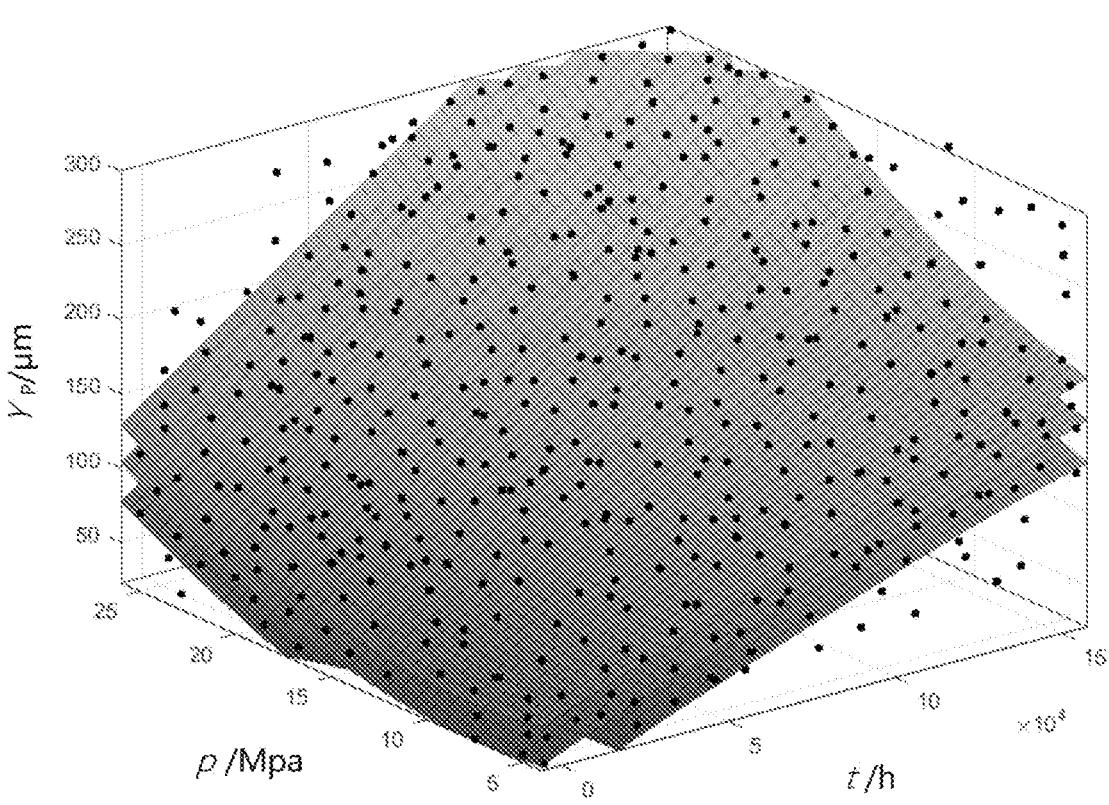
FIG. 3 is a three-time replicate fitted verification diagram of the actual data of the thickness of the inner oxide layer Yp and the selected pressure p and time t according to an embodiment of the present application.

Step 4: Repeating the fit for FIG. 2 and verifying the error rate of each coefficient in formula (9). A curved graph is drawn based on the formula (9), and then all data are substituted into the graph. If the data points basically fall on the curved graph, the prediction results of formula (9) are basically in line with the actual results. Since each coefficient fluctuates in a certain range, three fittings are performed to improve the accuracy and reduce the error. Finally, a three-time replicate fitted verification diagram of the actual data shown in FIG. 3 is obtained. It can be found that the data points in different working conditions basically fall on three predicted curved surfaces (boundaries) with an average error rate of 5%, indicating that the relationship between the thickness of the inner oxide layer Yp, the pressure p and the time tin the actual working conditions basically conforms to the function law described in the formula (9), then the coefficients are determined as a=22.21 b=0.0009334 c=−0.8198 d=−7.655×10−10 h=1.79×10−5 i=0.1152.

The fitting formula for the thickness of the inner oxide layer Yp and the steam pressure p is finally obtained as follows:

$$Yp=22.21'+'0.0009334t'+'(-0.8198p)+(-7.655\times \\ 100^{-10}t^2)\div1.79\times10^{-5}tp+-0.1152p^2 \qquad (10)$$

In the above formula, the unit of the time t is h, the unit of the steam pressure p is MPa, and the unit of the thickness of the inner oxide layer Yp is μm.

(3) A Relationship Between the Total Thickness of the Inner Oxide Layer Y and the Steam Temperature T and the Steam Pressure p.

In the process of fitting the experimental data, it is found that if the T and p are imported and fitted simultaneously, the results are not in line with the reality, and the error rate is high. The reason is that if temperature and pressure are simultaneously imported into a system, the two physical quantities themselves will interplay to be changed, and the system will have a closed-loop repeatability error, resulting in a large gap between the fitted results and the reality. The relationship between the thickness of the inner oxide layer and the steam temperature T or the steam pressure p has been obtained from the previous text. Next, we study the weight coefficients of the two on the thickness and determine a formula for calculating the total thickness of the inner oxide layer containing T and p.

Step 1: Determining the total thickness of the inner oxide layer by the formula:

$$Y=\omega*YT+(1-\omega)*Yp \qquad (11).$$

From the above, it can be seen that $$Y_T = 1.01 \times 10_{-42} T^{14.68}$$

$$\exp\left(\frac{-(106661.33557 - 0.36498t + 3.07915\times10^{-6}t^2)}{RT}\right)t^{0.25}$$

$$Yp = 22.21 + 0.0009334t + (-0.8198p) +$$

$$(-7.655\times10^{-10}t^2) + 1.79\times10^{-5}tp + 0.1152p^2.$$

where ω is the weight coefficient, YT is the relationship between the temperature and the thickness of the inner oxide layer in steam environment, and Yp is the relationship between the pressure and the thickness of the inner oxide layer in steam environment. The data at different temperatures and different pressures are substituted into the formulas to obtain calculated values and the calculated values are fitted against the actual values.

Step 2: After substituting the measured data of the thickness of the inner oxide layer at T=550° C., 575° C., 600° C., 625° C. and 650° C. for fitting, it is found that when the temperature is lower (T=550° C., 575° C.), w will fluctuate within 0.1~0.2, indicating that the effect of the temperature on the thickness of the inner oxide layer is not as great as that of pressure when the temperature is lower, and finally the measured data is substituted for fitting to obtain the value of the weight coefficient w of the temperature T as 0.1682±0.1136, and then the formula (11) is changed to Y=(0.1682±0.1136)*YT+(0.8318±0.1136)*Yp (12).

When the temperature is higher (T=600° C., 625° C., 650° C.), w will fluctuate within 0.6~0.8, indicating that when the temperature is higher, the effect of the temperature on the thickness of the inner oxide layer is greater than that of the pressure, and finally the measured data is substituted for fitting to obtain the value of the weight coefficient w of the temperature T as 0.6891±0.2269, and then the formula (11) is changed to $$Y=(0.6891\pm0.2269)*YT+(0.3109\pm0.2269)*Yp \qquad (13).$$

From the above steps, it can be seen that the weight coefficient w will become larger as the temperature increases, which is basically consistent with the variation law of the relationship between the temperature and the thickness of the inner oxide layer YT. In summary, the calculation formula for the thickness of the inner oxide layer Y and the temperature T and the pressure p is as follows:

When T is less than 600° C., Y=(0.1682±0.1136)*YT+(0.8318±0.1136)*Yp

When T is not less than 600° C., Y=(0.6891±0.2269)*YT+(0.3109±0.2269)*Yp $$Y_T = 1.01 \times 10_{-42} T^{14.68}$$

$$\exp\left(\frac{-\left(106661.33557 - 0.36498t + 3.07915 \times 10^{-6}t^2\right)}{RT}\right) t^{0.25}$$

$$Yp = 22.21 + 0.0009334t + (-0.8198p) +$$

$$\left(-7.655 \times 10^{-10}t^2\right) + 1.79 \times 10^{-5}tp + 0.1152p^2.$$

In the above formula, the unit of the steam temperature T is K, the unit of the steam pressure p is MPa, the unit of the time t is h, and the unit of the thickness of the inner oxide layer Y is μm.

Embodiment 1

Comparison of the calculation method involved in the present application with the experimental results of oxidation of T91 steel.

Nishimura et al. measures that at the steam temperature of 555~568° C. and the steam pressure of 25 MPa, the thickness of the inner oxide layer of T91 steel is about 71 μm after oxidation for about 1,451 hours. The experimental conditions are substituted into the formula (12) proposed in the embodiment of the present application to calculate the thickness of the inner oxide layer to be about 70.8602 with an error 0.19%.

Embodiment 2

Comparison of the calculation method involved in the present application with the experimental results of oxidation of T92 steel.

Muraki et al. measures that at the steam temperature of 555568° C. and the steam pressure of 25 MPa, the thickness of the inner oxide layer of T92 steel is about 149 μm after oxidation for about 29,920 hours. The experimental conditions are substituted into the formula (12) proposed in the embodiment of the present application to calculate the thickness of the inner oxide layer to be about 140.2092 with an error 5.9%.

Embodiment 3

An application of the calculation method involved in the present application in an actual power plant.

The material for the connecting pipe of the high re-collector of unit #6 in a power plant is T92 steel, the steam temperature is 615° C. and the steam pressure 5 MPa. After 15,479 hours and 19,037 hours of operation, the thickness of the inner oxide layer is measured to be 98 μm and 112 μm, respectively.

The steam temperature in the above operation parameters is substituted into YT (formula 7) to obtain the thickness of the inner oxide layer for 15,479 hours to be 105.8385 μm, with an error 7.9%. The steam pressure in the above operation parameters is substituted into Yp (formula 10) to obtain the thickness of the inner oxide layer for 15,479 hours to be 90.6411 μm, with an error 7.5%. The above two operation parameters are substituted into the formula (13) proposed in the embodiment of the present application to obtain the thickness of the inner oxide layer for 15,479 hours to be 100.9753 μm, with an error 3.0%.

The steam temperature in the above operation parameters is substituted into YT (formula 7) to obtain the thickness of the inner oxide layer for 19,037 hours to be 120.1865 μm, with an error 7.3%. The steam pressure in the above operation parameters is substituted into Yp (formula 10) to obtain the thickness of the inner oxide layer for 19,037 hours to be 103.4091 μm, with an error 7.7%. The above two operation parameters are substituted into the formula (13) proposed in the embodiment of the present application to obtain the thickness of the inner oxide layer for 19,037 hours to be 114.8177 μm, with an error 2.5%.

This shows that the error is smaller and the prediction result is more accurate after considering the temperature and the pressure together.

Embodiment 4

An application of the calculation method involved in the present application in an actual power plant.

The steam temperature of a supercritical power plant boiler is about 571° C., the steam pressure is about 25.4 MPa, and the pipe is made of T91 steel. After operation for about 12,956 hours, the thickness of the inner oxide layer is measured to be about 101 μm.

The steam temperature in the above operation parameters is substituted into YT (formula 7) to obtain the thickness of the inner oxide layer for 12,956 hours to be 108.4956 μm, with an error 7.4%. The steam pressure in the above operation parameters is substituted into Yp (formula 9) to obtain the thickness of the inner oxide layer for 12,956 hours to be 91.4774 μm, with an error 9.4%. The above two operation parameters are substituted into the formula (12) proposed in the embodiment of the present application to obtain the thickness of the inner oxide layer for 12,956 hours to be 102.8971 μm, with an error 1.8%.

This shows that the error is smaller and the prediction result is more accurate after considering the temperature and the pressure together.

All of the above embodiments show that the thickness of the inner oxide layer of 9% Cr martensitic steel calculated by the calculation method is in good agreement with the actual measurement results, and the error is within 6%.

The technical solutions of the present application are not limited to the above embodiments, and any technical solution obtained by using equivalent substitution falls within the scope of the present application.

What is claimed is:

1. A non-destructive method for enhancing a structural management of a martensitic heat-resistant steel component in a steam environment, wherein the martensitic heat-resistant steel component is 9% Cr martensitic heat-resistant steel component, and the method comprising:

obtaining operation parameters of the 9% Cr martensitic heat-resistant steel component, wherein the operation parameters comprises a steam temperature T, a steam pressure p, and an operation time t;

calculating a thickness Y of an inner oxide layer on a wall surface of the 9% Cr martensitic heat-resistant steel component, wherein the thickness Y of the inner oxide layer directly indicates a consumed metal thickness of a component wall, and using a coupled functional model that accounts for a combined influence of the steam temperature and the steam pressure:

$$Y = \omega * Y_T + (1-\omega) * Y_p$$

wherein Y is the thickness of the inner oxide layer in the steam environment ($\mu$m), $Y_T$ is a relationship between the steam temperature and the thickness of the inner oxide layer in the steam environment ($\mu$m), $Y_p$ is a relationship between the steam pressure and the thickness of the inner oxide layer in the steam environment ($\mu$m), $\omega$ is a weight coefficient representing a relative contribution of the steam temperature and the steam pressure to an inner oxide layer growth, T is the steam temperature (K), p is the steam pressure (MPa), t is time (h); and determining an effective remaining wall thickness of the 9% Cr martensitic heat-resistant steel component by subtracting the calculated thickness Y from an initial wall thickness, and evaluating a risk of pipe failure based on the effective remaining wall thickness, thereby providing an improved basis for preventing pipe burst accidents without requiring destructive physical inspection.

2. The method according to claim 1, wherein $Y_T$ and $Y_p$ are calculated by:

$$Y_T = k \exp\left(\frac{-Q}{RT}\right) t^n$$

$$Y_p = a + bt + cp + dt^2 + hpt + ip^2$$

wherein k, a, b, c, d, h, i are fitting coefficients, Q is an activation energy (J·mol$^{-1}$), R is a gas constant; and the steam temperature is from 550 to 650° C. and the steam pressure is from 5.0 to 25.0 MPa.

3. The method according to claim 1, wherein the time t is from 1,000 to 150,000 h.

4. The method according to claim 1, wherein in the formula for calculating the Y, in response to that the steam temperature T is less than 600° C., $\omega$ is 0.1682±0.1136; in response to that the steam temperature T is not less than 600° C., $\omega$ is 0.6891±0.2269.

5. The method according to claim 1, wherein in the formula for calculating the $Y_T$, n is equal to 0.25.

6. The method according to claim 2, wherein a mathematical relationship between the fitting coefficient k and the steam temperature T in the formula for calculating the $Y_T$ is $$k = 1.01 \times 10^{-42} T^{14.68}.$$

7. The method according to claim 2, wherein an activation energy (Q) is a variable that changes with time; and wherein a mathematical relationship between the activation energy Q and the time t in the formula for calculating $Y_T$ is $$Q = 106661.33557 - 0.36498t + 3.07915 \times 10^{-6} t^2.$$

8. The method according to claim 2, wherein in the formula for calculating $Y_p$, the fitting coefficient a is 22.21, the fitting coefficient b is 0.0009334, the fitting coefficient c is −0.8198, the fitting coefficient d is −7.655×10$^{-10}$, the fitting coefficient h is 1.79×10$^{-5}$, and the fitting coefficient i is 0.1152.

* * * * *